United States Patent [19]
Verdun

[11] 3,892,365
[45] July 1, 1975

[54] APPARATUS FOR PREPARING FOOD

[76] Inventor: Pierre Verdun, 4 bis Ave. de la Belle-Gabrielle, Fontenay-Sous-Bois, France

[22] Filed: Jan. 24, 1974

[21] Appl. No.: 436,198

Related U.S. Application Data

[63] Continuation of Ser. No. 228,513, Feb. 23, 1972, abandoned.

[30] Foreign Application Priority Data

July 23, 1971 France .............................. 71.27039

[52] U.S. Cl. ................. 241/92; 241/282.1; 259/108
[51] Int. Cl. ............................................ B02c 18/12
[58] Field of Search ............ 241/277, 282.1, 282.2, 241/199.12, 46.17, 166, 167, 92; 251/107, 108, DIG. 25, DIG. 26

[56] References Cited
UNITED STATES PATENTS

| | | | |
|---|---|---|---|
| 2,590,909 | 4/1952 | Westby et al. | 241/92 X |
| 2,856,976 | 10/1958 | MacDougall | 241/92 |
| 2,894,551 | 7/1959 | Otto | 241/199.12 |
| 3,032,087 | 5/1962 | Rodick | 241/92 |
| 3,493,022 | 2/1970 | Mantelet | 241/199.12 |
| 3,612,125 | 10/1971 | Krauth | 241/199.12 |
| 3,612,126 | 10/1971 | Emmons et al. | 259/108 X |
| 3,612,414 | 10/1971 | Nevison et al. | 241/199.12 |

*Primary Examiner*—Roy Lake
*Assistant Examiner*—Howard H. Goldberg
*Attorney, Agent, or Firm*—Parmelee, Johnson & Bollinger

[57] ABSTRACT

This apparatus for preparing food comprises interchangeable tools adapted to be operatively connected to the rotary shaft of a driving motor disposed in casing underlying the working bowl. This bowl is detachably mounted on top of said casing and comprises on its outer peripheral wall a substantially vertical channel in which a push member is slidably mounted and adapted to engage with its lower end the control member of an ON-OFF switch inserted in the energizing circuit of the motor and carried by the motor casing. A detachable lid associated with the bowl is adapted to actuate said push member and therefore said switch. Said tool comprise notably rotary blades, a perforate basket, rasping and cutting disks, etc., for cutting, blending, grating, grinding, chopping, mixing, whipping and otherwise processing food materials.

13 Claims, 6 Drawing Figures

APPARATUS FOR PREPARING FOOD

This is a continuation of application Ser. No. 228,513, filed Feb. 23, 1972, now abandoned.

The present invention relates to apparatus for preparing food, notably multi-purpose kitchen apparatus, such as blenders, comprising a plurality of interchangeable rotary tools such as knives, blades, cutting disks, rasping disks, etc. for performing operations such a mixing, blending, grating, grinding, chopping, whipping, etc.

More particularly, this invention relates to apparatus of the type broadly set forth hereinabove, comprising a power unit constituting the base of a working bowl or vessel with the motor shaft projecting upwards through the bottom of said bowl or vessel for receiving the selected tools.

It is the essential object of this invention to bring a number of improvements in apparatus of this character, notably with a view to increase their efficiency and facilitate their use.

This apparatus is characterized essentially in that its working vessel or bowl is detachably mounted on the top of the motor casing, its peripheral wall comprising a channel extending throughout the height of said vessel and having slidably mounted therein a push member adapted to control with its lower end the ON-OFF switch of the motor. On the other hand, the detachable lid of this vessel comprises a cam member adapted to actuate the upper end of said push member when the lid is properly positioned on the vessel.

According to another feature characterizing this apparatus the bottom of the detachable bowl or vessel comprises a central hole through which the output shaft of the motor is adapted to project, said hole being surrounded by a vertical concentric socket or skirt of relatively substantial height leaving a certain clearance about the shaft so that the hub of a working tool can be inserted into said clearance.

Other features and advantages of the apparatus of this invention will appear as the following description proceeds with reference to the accompanying drawing illustrating diagrammatically a typical form of embodiment thereof. In the drawing.

Figure 2:
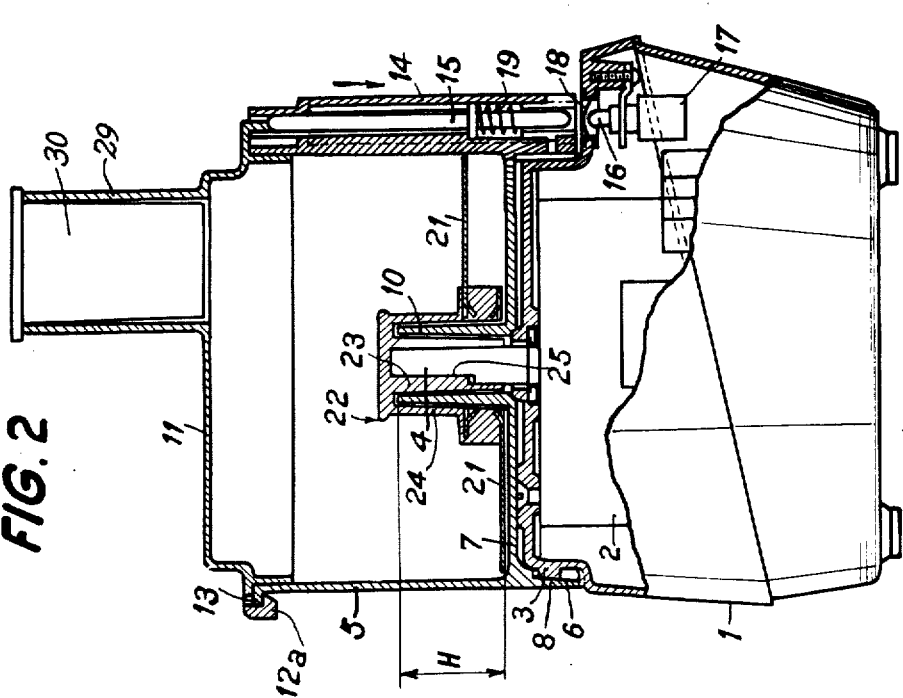
FIG. 2 is a part-sectional, part-elevational view of the same apparatus, with the wall of the motor casing broken away.
Figure 1:
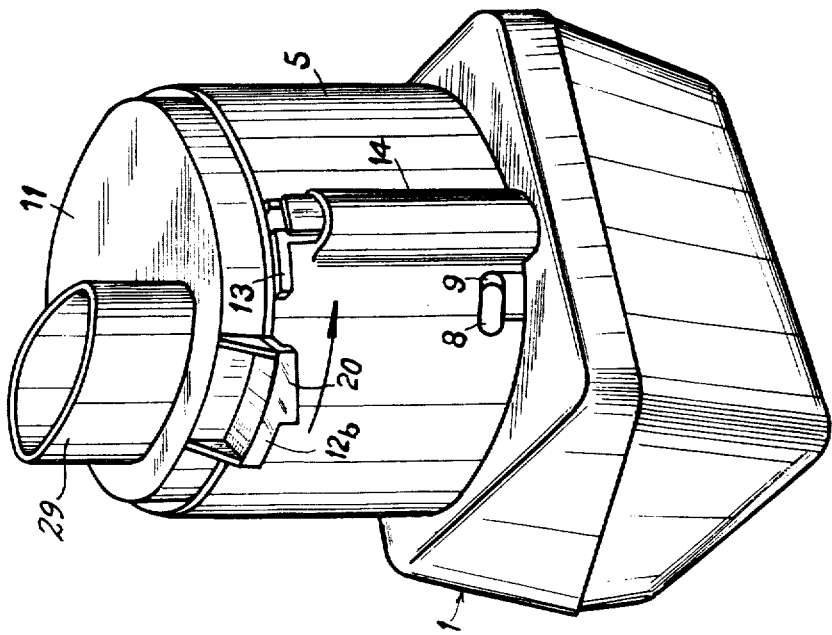
FIG. 1 is a perspective view of the kitchen apparatus of this invention.

The apparatus illustrated by way of illustration, not of limitation, in the attached drawing comprises a power unit designated in general by the reference numeral 1; this power unit 1 constitutes a casing enclosing the electric motor 2. The upper portion of this casing comprises a circular-sectioned peripheral projection 3 and the output shaft 4 of motor 2 projects concentrically and centrally of this projection 3, up to a relatively substantial distance thereabove.

In combination with this power unit 1 the apparatus comprises a detachable working vessel or bowl 5 of substantially cylindrical configuration and having a diameter very slightly greater than that of said projection 3 of the motor unit casing, so that the lower edge of said vessel, constituting a cylindrical skirt 6, can fit around said projection 3. To this end, the bottom 7 of vessel 5 is somewhat spaced above said skirt 6.

Complementary means are provided on said vessel and said projection 3 of power unit 1 for detachably assembling these two bodies with each other. These means may consist inter alia of a pair of lateral tenons 8 carried by the outer peripheral surface of projection 3 and corresponding notches 9 formed in the aforesaid skirt 6 of the vessel. The arrangement is such that these means may constitute bayonet fasteners operating by rotating the vessel 5 after the latter has been properly lowered in position.

A central hole is formed through the vessel bottom 7 to permit the passage of the rotary driving shaft 4. However, this hole is surrounded by an upstanding socket 10 formed integrally or rigid with the bottom 7. The height H of this socket 10 is relatively great, i.e. of the same order of magnitude as the projecting portion of said shaft 4.

This height is determined with a view to provide in the lower portion of the vessel s a volume sufficient for containing the prepared food, or possibly fruit juices or other liquids prepared in this apparatus. Moreover, it may be noted that the central socket 10 provides a certain free annular space about the shaft 4 to permit the insertion, between said socket and shaft, of the hub of a working tool adapted to be rotatably connected to shaft 4.

At its upper end the vessel 5 comprises a detachable lid 11. This lid 11 is secured in its closed position by means of anchoring lugs 12a, 12b adapted to be inserted under retaining ledges 13 formed integrally with the upper edge of vessel 5, the lugs being also positioned under these ledges by rotating the lid 11.

According to an essential feature characterizing this invention the peripheral wall of vessel 5 comprises a vertical, part-cylindrical boss 14 extending through nearly the entire height of the vessel and formed with an internal channel enclosing a vertical sliding rod 15 adapted to constitute a push member for actuating the control knob 16 of an electric ON-OFF switch 17. This switch 17 is mounted within the motor casing 1 and the end of its control knob 16 flush with the top surface of casing 1 is covered with a flexible fluid-tight membrane 18.

The relative angular positions of the means provided for assembling the vessel 5 and motor casing 1 are such that when these elements are properly assembled the push member 15 is vertically aligned with the push or control knob 16 of switch 17. However, a spring 19 constantly urges the push member 15 to its uppermost position to prevent it from depressing the control knob 16 of switch 17 when inoperative.

However, the detachable lid 11 is provided with a lateral cam member 20 adapted to depress the top end of push member 15 and thus actuate the control knob 16 of switch 17 when said lid 11 is lowered and rotated to its final position. Thus, switch 17 cannot be actuated unless the lid is properly positioned. Now this switch 17 is inserted in the control circuit of the driving motor 2, so that this motor can be energized only after closing the lid 11 and also only after switch 17 is operated through push member 15. This arrangement provides a positive safety feature preventing the operation of the apparatus as long as the lid is not set in its final position.

This apparatus is equipped with a number of interchangeable tools adapted to be coupled to the driving shaft 4, the type and characteristics of these tools being subordinate of course to the type of work to be performed.

Among these tools, a device comprising rotary blades is provided. This device comprises more particularly two blades 21 rigid with a hub designated in general by the reference numeral 22. However, this hub comprises two concentrical cylindrical portions interconnected by an upper cap, i.e. an inner sleeve 23 and an outer sleeve 24. The outer sleeve 24 carries of course the pair of cutter blades 21, and the inner sleeve 23 is adapted to fit into the skirt or socket 10 projecting from the bottom of vessel 5 so as to be drivingly coupled with the motor shaft 4. To this end, the shaft 4 is formed with a flat face 25 and the inner sleeve 23 of the tool hub comprises an inner projection mating with said flat face.

With this arrangement a perfect fluid-tightness is obtained in the vessel bottom. In fact, the juices and other liquids obtained during the preparation of certain foods cannot flow into the socket 10 and through the central hole into the motor casing.

In this respect it may be noted that the double hub 22 of the working tools is also useful for preserving the fluid-tightness when the vessel or bowl 5 is removed from the base casing 1 while the former is filled with liquid resulting from a previous operation. To recover the liquid contained in the bowl 5 the latter can be removed from the base casing 1, provided that the double hub 22 is left in its bottom.

It is clear that the arrangement of this working tool is such that in the operative position thereof one blade 21 is in close vicinity of the bottom 7 of vessel 5 while the other blade 21 is spaced therefrom.

The presence of a rotary blade in close vicinity of the bottom 7 is attended by various advantages, notably that of permitting the operation of the apparatus with very small amounts of food, a feature not encountered in apparatus not provided with this specific arrangement.

The rotary cutter mounting 21 may also be used for different kinds of works, notably for cutting or mincing meat. In this respect, stress should be laid on the fact that with this apparatus it is possible to cut and mince meat without bursting the cells thereof, in contrast with hitherto known apparatus operating essentially by crushing. However, the rotary cutter 21 may also be used for cutting vegetables of all kinds, notably condiments (parsley, garlic, onions, etc.). This tool is also suitable for working and preparing doughs and pastes, for instance puff paste. However, it can also be used for preparing a mayonnaise or any other similar emulsion.

Figure 3:
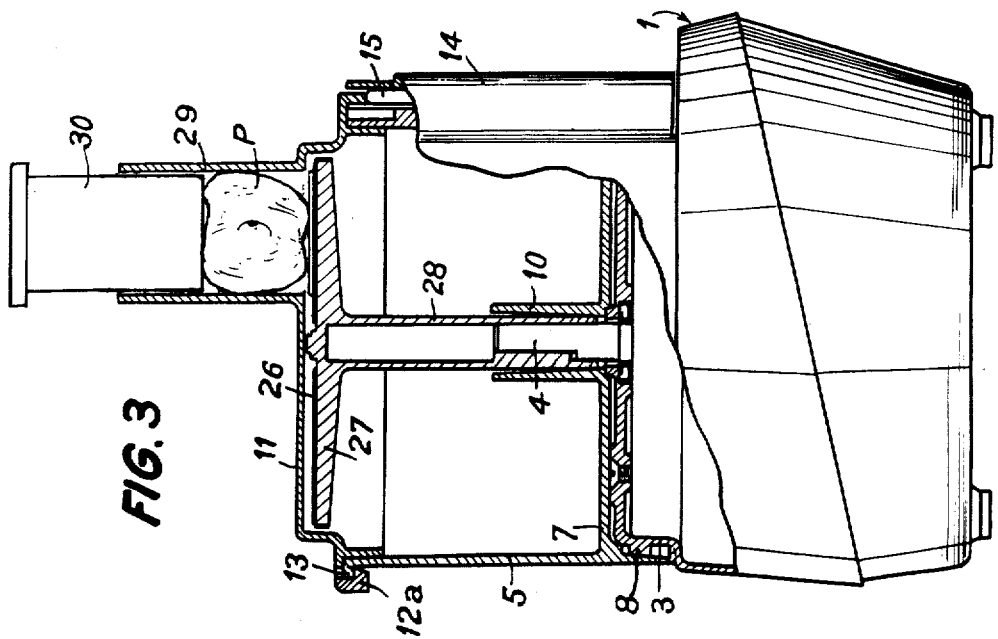
FIGS. 3 and 4 are views similar to FIG. 2 showing the apparatus equipped with different working tools.
Figure 5:
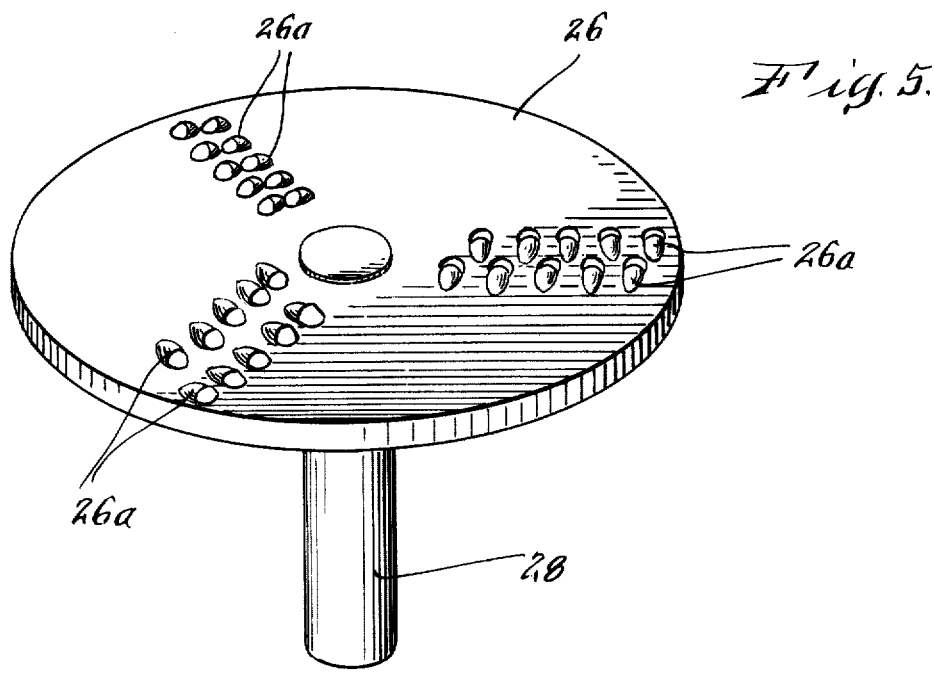
FIG. 5 is a perspective view illustrating a rasping tool.

This apparatus comprises a course other tools, notably one or more rotary disks such as rasping disks 26 of which a typical example is illustrated in FIGS. 3 and 5.

This disk is carried by diametral arms 27 rigid with a relatively long hollow hub 28 of which the lower end is adapted to be fitted into the socket 10 in the bottom of vessel 5 so as to surround the driving shaft 4 and be coupled therewith.

This hub 28 is nearly as high as the vessel itself so that the disk 26 is very close to the lid 11 in its operative position.

This sheet metal disk 26 (preferably of stainless steel) has a great number of small claws 26a (FIG. 5) formed by punching therein and adapted to be ground and sharpened. Thus, these claws are adapted to rasp the lower surface of a piece of food, for instance cheese, denoted P and inserted into a hopper or well 29 rigid with the lid 11, a movable pusher 30 being provided therein for pressing the piece of food against the top surface of said rasp 26.

Figure 6:
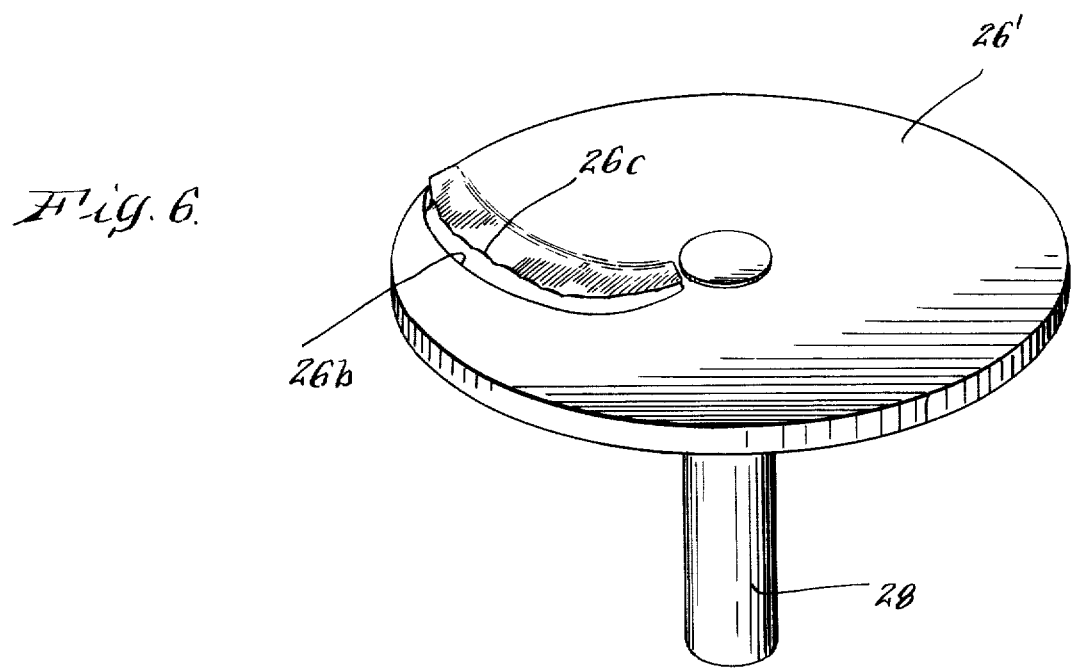
FIG. 6 is a perspective view illustrating a cutting tool.

However, another disk 26' (FIG. 6) may be substituted to this disk 26 for cutting the food into small lamellae. In this case the disk 26' is a sheet metal member, also preferably of stainless steel, comprising a slot 26b and a sharpened cutting edge 26c.

As in the case of disk 26, this cutting disk 26' is carried by diametral arms 27 rigid with a hub 28 of a height sufficient to position this disk in close vicinity of the under face of lid 11.

Figure 4:
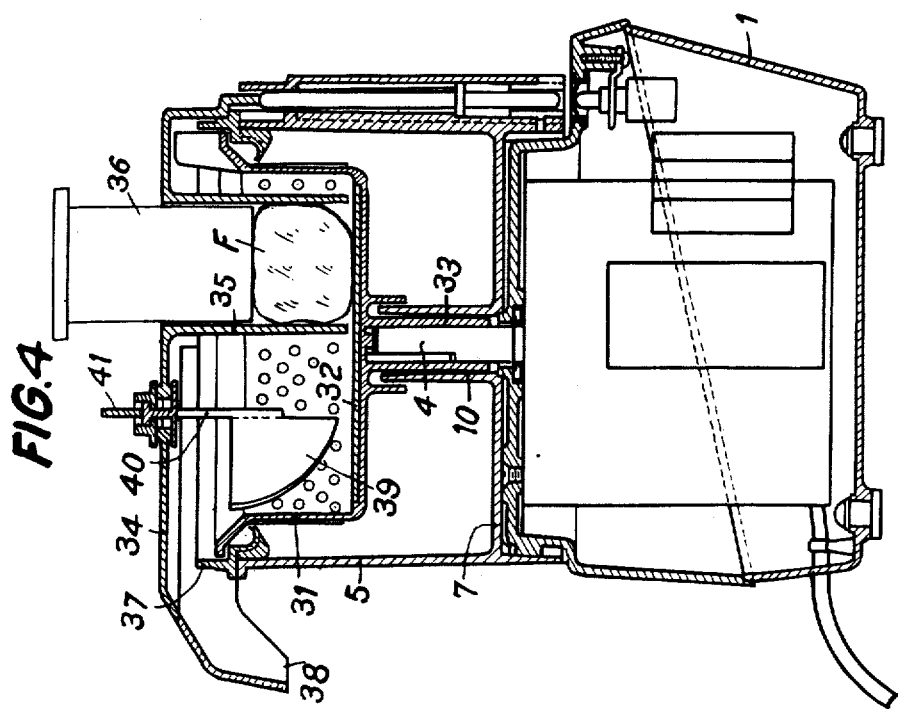

As illustrated in FIG. 4, this apparatus may also be provided with a perforated centrifugation basket 31 for preparing fruit juices. To this end, the bottom of this perforated basket 31 carries a rasping disk 32. On the other hand, this basket 31 is rigid with a hub 33 adapted to fit into the socket 10 and thus be coupled to the driving shaft 4.

When this tool is used the lid 11 described hereinabove is replaced with another lid 34 provided with a hopper or well 35 for introducing the fruits to be pressed.

This hopper or well consists of a depending shirt extending to within a short distance of the rasping disk 32, a movable pusher 36 being provided for pressing each fruit or batch of fruits thereagainst.

The lid 34 is secured to the vessel or bowl 5 in the same fashion as lid 11. However, these two members are separated by an intermediate ring-shaped member 37 comprising a lateral aperture or spout 38 for delivering the pulps and residues.

In fact, during the operation of the apparatus the fruits are rasped by the disk 32 and the resulting juices are ejected through the perforations provided along the outer marginal or peripheral portion of basket 31, so that they flow down to the bottom of vessel 5. However, the pulps and other residues remain in the form of a solid layer adhering against the inner vertical wall of basket 31.

To remove these solid residues the apparatus comprises a scraper blade 39 carried by a control arm 40 of which the upper end is slidably mounted through the lid 34 and provided above this lid with a control knob 41.

Thus, by moving the scraper blade 39 towards the inner vertical wall of basket 31 it is possible to remove the pulp and residues, from which the juice has already been expressed, by rotating the basket. Thus, the residues are thrown upwards and subsequently discharged by the centrifugal force through said lateral opening 38. The provision of this scraper blade 39 is therefore advantageous in that it prevents an undesired clogging of the centrifugal basket after the pressing of two or more fruits, thus further enhancing the efficiency of the apparatus.

As already mentioned in the foregoing, the fruit juices obtained during this operation are collected in the bottom of vessel 5, and can therefore easily be recovered therefrom previous removal of the centrifugal basket 31.

However, it is also possible to provide in the vessel or bowl 5 itself some discharge means such as a tap, cock or any other suitable control device.

Obviously, this apparatus may be completed with many other tools for performing different operations in the preparation of food, pastry, etc. as will readily occur to those conversant with the art, without departing from the basic principles of the invention as set forth in the appended claims.

I claim:

1. Apparatus for preparing foods, which comprises a working vessel mounted on top of a motor casing, said motor casing having a motor therein and an energizing circuit for said motor with an ON-OFF switch in said circuit, said working vessel having a bottom wall with a hole therein and said motor casing having a rotary motor-driven shaft adapted to extend up through said hole with a working tool having a hub portion mounted on the upper end of said shaft, said working tool being located in said vessel for working food in said vessel, complementary fastening means on said motor casing and vessel for removably fastening them together, said vessel including on its outer peripheral wall a substantially vertical channel extending throughout the height of said vessel, a push member slidably mounted in said channel and adapted when said vessel and casing are properly fastened together by said fastening means to have its lower end aligned with a control member on the ON-OFF switch in said energizing circuit, said vessel including a detachable lid provided with cam means, securing means engageable between said lid and said vessel for anchoring said lid on said vessel, said cam means being adpated to depress the upper end of said push member to cause the lower end of said push member to hold said ON-OFF switch in its ON position when said lid is properly placed on said vessel with said securing means engaged between said lid and said vessel.

2. Apparatus for preparing foods according to claim 1, characterized in that the bottom wall of said vessel has a vertical concentric socket extending upwardly into said vessel to a predetermined height above the bottom of said vessel, said socket surrounding said rotary shaft, said socket having a height above the bottom of said vessel of the same order of magnitude as the projecting portion of said rotary shaft extending up through said hole, said socket being spaced from said shaft for leaving a clearance in said socket about said shaft to permit the insertion of the hub portion of the food-working tool.

3. Apparatus for preparing foods according to claim 2, characterized in that said hub portion of the working tool comprises two concentric cylindrical sleeves interconnected by an upper cap member, including an inner cylindrical sleeve adapted to be inserted into said clearance in the socket about the shaft for establishing the driving connection with the rotary shaft and an external cylindrical sleeve adapted to surround said socket, and a pair of cutting blades being carried by said external cylindrical sleeve.

4. Apparatus for preparing foods according to claim 1, characterized in that the working tool located in said vessel comprises a cutting disk carried by said hub portion adapted to be drivingly connected to said rotary shaft, said hub portion having a height inferior to that of said vessel whereby, in the operative position of said working tool, said cutting disk extends across the vessel in the upper portion thereof beneath the lid, said detachable lid including a hopper member providing a passage down therethrough for introducing food products through said passage to be cut by said disk.

5. Apparatus for preparing food according to claim 1, characterized in that the working tool located in said vessel comprises a rasping carried by said hub portion adapted to be drivingly connected to said rotary shaft, said hub portion having a height less than that of said vessel, whereby in the operative position of said working tool, said rasping disk extends across the vessel in the upper portion thereof beneath the lid, said detachable lid including a well member providing a passage down through the lid for introducing food products to be rasped by said disk.

6. Apparatus for preparing foods according to claim 1, characterized in that the working tool located in said vessel comprises a basket carried by said hub portion adapted to be drivingly connected with said rotary shaft, said basket having a bottom with a lateral side wall extending up around said bottom and having in its bottom a rasping surface adapted to rasp fruits, and said lid having a hopper extending down through the lid for introducing fruits having juices into said basket, the lateral wall of said basket being perforated to permit the ejection of the fruit juices squeezed out so that they can be collected in the bottom of said vessel.

7. Apparatus for preparing foods according to claim 6, characterized in that said lid includes a movable scraper blade extending downwardly into said basket and adapted to be moved towards the inner surface of said lateral wall, said lid further including an orifice for expelling the fruit residues thus detached from said basket by said scraper blade.

8. Apparatus for preparing foods according to claim 1, characterized in the spring means in said channel normally urges said push member upwardly, said cam means overcoming the force of said spring means to depress said push member when said lid is properly assembled with said vessel with said securing means engaged between said lid and said vessel.

9. Apparatus for preparing foods according to claim 8, characterized in that said securing means engageable between said lid and said vessel are engaged by lowering the lid onto the vessel and then rotating the lid with respect to the vessel, and said cam means is a lateral cam member positioned on the lid to depress said push member when the lid has been lowered and rotated to its final engages position.

10. In apparatus for preparing foods including a motor casing having a driving motor disposed therein and a rotary drive shaft extending vertically from the casing with a working vessel detachably mounted on top of the motor casing, the bottom of said vessel having a hole therein to permit said drive shaft to project up into said vessel, the invention comprising an upstanding socket formed rigidly with the bottom of the vessel and surrounding said hole, said upstanding socket having a height of the same order of magnitude as the portion of said drive shaft projecting into said vessel, said upstanding socket being spaced from said shaft to define an annular space within said socket about said shaft, a rotatable tool having a hub coupled to said drive shaft, said hub including inner and outer concentric cylindrical sleeve portions interconnected by an upper cap, said inner sleeve fitting down within said upstanding socket in driving engagement with the drive shaft, said outer sleeve extending down and encircling said upstanding socket and having a plurality of cutter blades securd thereto, whereby the upstanding socket provides a volume in the bottom of the vessel for containing food, juices, or liquids, which are prevented by said upstaning socket from flowing out through said hole and whereby said hub structure preserves the fluid-lighteness of the vessel.

11. In apparatus for preparing foods, the invention as claimed in claim 10, characterized in that said outer sleeve carries a pair of cutter blades extending therefrom on opposite sides of the hub, a first one of said blades being positioned in close vicinity of the bottom of said vessel along the length of said blade with a small spacing between the bottom and said first blade, and the second one of said blades being positioned higher up on said outer sleeve.

12. In apparatus for preparing foods, the invention as claimed in claim 11, characterized in that said blades extend out to a diameter close to the diameter of the vessel with a small spacing between the tip of each cutter blade and the vessel wall.

13. Apparatus for preparing foods comprising a motor casing disposed beneath a detachably mounted working vessel, said vessel including a horizontal bottom having a hole therein with a drive shaft extending from the motor casing up through the hole in the bottom of the vessel into the vessel, the bottom of said vessel having an upstanding annular wall surrounding said hole, a rotatable tool having a hub engageable with said drive shaft, a plurality of thin rigid cutter blades secured to said hub and extending therefrom, said hub having a downwardly extending outer portion encircling said annular wall, said outer portion of the hub extending down to a bottom end closely adjacent to the horizontal bottom of the vessel, a first one of said blades being secured to said outer portion of the hub at the bottom end of said outer portion, said first blade being positioned parallel with and closely adjacent to the bottom of said vessel and being in close vicinity with the bottom along the length of said blade with a small spacing between the bottom of said vessel and said first blade, and said first blade extending out to a diameter close to the full diameter of said horizontal bottom for permitting the operation of the appratus with very small amounts of food, and a second one of said blades being positioned higher up on said hub spaced from the bottom of the vessel.

* * * * *